United States Patent [19]

Pennel et al.

[11] Patent Number: 4,512,176
[45] Date of Patent: Apr. 23, 1985

[54] COUPLING MEMBER AND METHOD OF MANUFACTURING SUCH A COUPLING MEMBER

[76] Inventors: Jean-Francois Pennel, 132, Boulevard de l'Hopital, 75013 Paris; Patrick H. Vesnier, 6, rue Euryale Dehaynin, 75019 Paris, both of France

[21] Appl. No.: 576,959

[22] Filed: Feb. 3, 1984

Related U.S. Application Data

[62] Division of Ser. No. 211,137, Nov. 28, 1980, Pat. No. 4,440,519.

[51] Int. Cl.³ .............................................. B21D 53/36
[52] U.S. Cl. ....................................... 72/367; 72/416
[58] Field of Search ................. 72/367, 412, 416, 470, 72/474; 29/150

[56] References Cited

U.S. PATENT DOCUMENTS

| | | | |
|---|---|---|---|
| 1,882,352 | 10/1932 | Woodhead et al. | 29/150 |
| 2,467,125 | 4/1949 | Glynn | 72/470 |
| 4,253,224 | 3/1981 | Hickman et al. | 72/367 |

FOREIGN PATENT DOCUMENTS 347108  1/1922  Fed. Rep. of Germany ........ 72/470

*Primary Examiner*—Lowell A. Larson
*Attorney, Agent, or Firm*—Brisebois & Kruger

[57] ABSTRACT

The invention provides a device for coupling together two elements, each of predetermined shape, so that the two elements are prevented from rotating relative to the device. The device is constituted by a band, which is substantially rigid and is in the form of a closed loop. The band has two rims which are three-dimensionally out of true, and each rim delimiting an opening, which forms the limit of a recess, in which one of the elements to be coupled together can be positioned. The regions of each of the two recesses which lie opposite the openings form part of a single space which is laterally delimited by the band. Each rim substantially constitutes a curve traced on a convex surface of the element of predetermined shape to be coupled.

The invention also provides a method of making a coupling device.

10 Claims, 11 Drawing Figures

COUPLING MEMBER AND METHOD OF MANUFACTURING SUCH A COUPLING MEMBER

This is a division of application Ser. No. 211,137, filed Nov. 28, 1980 now U.S. Pat. No. 4,440,519 granted Apr. 3, 1984.

The present invention relates to a coupling member for mechanically coupling together two elements, the elements being prevented from rotating relative to the coupling member. The coupling member is particularly useful for coupling together cylindrical elements, for example tubes, but it can also be used for holding planar elements.

As is well known, it is often necessary to couple mechanically together two elements for the purpose of providing a load-bearing structure for example, in shelving structures or in scaffolding. The elements, which are to be coupled together, may, in particular, be cylindrical elements, such as rods or tubes, or planar elements, such as plates, shelves or metal sheets. Up to the present time, known coupling members have been of relatively complicated construction, of relatively high cost price, and it has taken a relatively long time to bring them into operation. The present invention has the object of providing a coupling member which is of low cost, and which can be brought into operation extremely quickly. Furthermore, the coupling member according to the invention has an indisputably pleasing appearance, which is an important advantage when compared with the prior art coupling members.

According to the invention, a coupling member is made from a substantially rigid band which is in the form of a closed loop, each rim of the said band delimiting an opening into which one of the elements to be coupled together penetrates and substantially constitutes a curve traced on a convex surface of the said element. It is advantageous to obtain the coupling member according to the invention from a cylindrical ring which is deformed by means of two tools, each having a profile shape corresponding to that of an element associated with the coupling member. However, this embodiment is not to be considered as limitative, as the coupling member according to the invention can also be obtained in any other way, e.g. by moulding. The quantity of working material of which the coupling member according to the invention is made is very small and, consequently, the coupling member is light, which represents an additional advantage. The coupling member may be made from any suitable material. It is evident that the choice of material is a function of the usage to which the coupling member is to be put. Furthermore, the load, which the said member will have to bear, will determine whether a band, constituting the coupling member, will be made from metal of more or less large thickness, or from a plastics material. When the coupling member is made by cold deformation of a metal ring, e.g. by means of a stamping press, a sufficiently ductile metal will be selected, so that the stamping operation can take place satisfactorily.

When the element to be coupled to the coupling member according to the invention is a cylindrical element, the annular band of which the coupling member is made can be shaped in such a way that it grips the cylindrical element over a sufficient proportion of the contour of the cylindrical element to ensure that the element is incapable of any translatory motion relative to the coupling member apart from movement in the direction of the element's own longitudinal axis. For an embodiment with a cylindrical element of circular cross-section, this result will be obtained by taking steps to ensure that the rim of the band extends along a sector of a cylinder contained in dihedron, which has the longitudinal axis of the cylindrical element as its edge or ridge and which has an angle greater than 180°. When a coupling member of this type is obtained by deformation of a cylindrical ring, e.g. by stamping a metal ring by means of a cylindrical tool, withdrawal of the tool, after the stamping action has been completed, takes place in a simple way, through the tool sliding along its own longitudinal axis relative to the coupling member which has been formed by the stamping action.

The material of which the coupling member is made is substantially rigid, although it may be resiliently deformable. Accordingly, provision can be made for introducing the element (to be coupled) into a recess, which it is to occupy in the coupling member, by applying, subject to force, a momentary deformation to the coupling member, a return to the initial shape of the member being assured by the resilience of the material. Furthermore, the deformation can also take place, instead of at the level of the coupling member, at the level of the element introduced into a recess of the coupling member. Such a mode of assembly can, for example, take place when the element to be coupled is a cylindrical element, when the coupling member is shaped in such a way as to prevent the cylindrical element and the coupling member becoming separated otherwise than by a sliding movement along the longitudinal axis of the element, and at least one of the two components is made of a plastics material.

It is conceivable that at least one of the elements be be coupled together by the coupling member will be a tubular, angled element, in which case it will be possible to position the tubular element in its recess by a driving action accompanied by resilient deformation, as indicated above, or by a sliding action if the curvature of the element permits this.

When the two elements coupled together by the coupling member according to the invention are cylindrical elements, provision can be made for maintaining the longitudinal axes of the elements at a predetermined mutual spacing. However, if the spacing in question is less than the sum of the radii of the two elements, it will be necessary to deform or groove one of the elements so as to allow the other element to be brought into position. In the extreme case, if the distance between the axes of the two cylindrical elements coupled together is zero, one of the two elements will have to be cut into two sections, which are positioned on both sides of the element which is in the form of a unit. At the same time, if the coupling member is obtained by deformation of a ring, it will be found to be satisfactory if one of the tools is grooved so as to allow passage to the other element at the instant at which stamping takes place and, in the extreme case, provision will be made for one of the tools to be in the form of two separate sections, the other tool passing, in the course of stamping, between the two abovementioned sections. It is to be noted that, if the distance between the two tubular elements coupled together is less than the sum of the radii, and if one of the tubular elements is deformed in order to allow the other tubular element to be brought into position, as indicated above, and if, furthermore, the coupling means is made in such a way as to hold the tubular elements within the recess due to a sufficient closure of the rims of the band, of which the coupling member is made, then one of the tubular elements will be locked in position relative to the other, and the other tubular element will only be able to slide along its own axis.

In all instances, if it is desired to immobilise the coupling member relative to the element, which is coupled together with the coupling member, it suffices if a locking means, such as a point screw, is provided on the band, this point screw assuming a position in which it bears against the element to be immobilised.

The coupling member according to the invention can be used for coupling together elements which it is desired to immobilise relative to one another, as in for example building structures, furniture, shelving, scaffolding or construction sets, or the coupling member can be used for assembling together elements which can slide relative to one another in preselected directions. In this latter case, the coupling member defines a slideway for each of the two elements assembled together. When cylindrical elements, e.g. tubes, are assembled together using the coupling member, the angle between the axes of the cylinders of the two elements assembled together can be of any size, but it appears that the practical application occuring most frequently at the present time is where the angle between these axes is 90°.

Two planar elements, e.g. two mutually perpendicular plates can also be assembled together using the coupling member according to the invention. It is also possible to assemble together a planar element and a cylindrical element, e.g. a tube and a plate which extend perpendicularly to each other. It is clear, that in the case where the element to be coupled is a plate, the mechanical coupling obtained simply prevents the plate rotating relative to the tube, but the coupling does not prevent, simply through the shape of the band of the coupling member, translatory motion of the plate relative to the coupling member. However, this translatory motion can be prevented by an immobilising (locking) means associated with the coupling member, such as a point screw.

The present invention provides a member by which mechanical coupling between two elements, each of predetermined shape, can be assured, rotation of these elements relative to the said member being prevented, characterised in that the member is constituted by a substantially rigid band in the form of a closed loop, the two rims of the said band being three-dimensionally out of true and each delimiting an an opening which forms the limit of a recess in which one of the elements to be coupled together can be positioned, the areas of each of the two recesses which lie opposite the said openings forming part of a single space which is laterally delimited by the said band, each rim substantially constituting a curve traced on a convex surface of the part of the element of predetermined shape which is to penetrate into the corresponding recess.

In a preferred embodiment the minimum linear distance between a point on one of the rims of the band and the other rim is substantially constant, wherever the point is taken on the first rim. In this context, the expression "substantially constant" indicates that the variation of the distance in question is smaller than 100%. Each of the two openings defined by the rims of the band has a longitudinal plane of symmetry passing through the two points of the corresponding rim which lie at a maximum distance from each other. The longitudinal planes of symmetry of the two openings form a dihedron, and the two openings defined by the rims of the band have a transverse plane of symmetry extending perpendicularly to their longitudinal plane of symmetry. In the embodiment where the two elements coupled by the coupling member are identical, the two openings defined by the rims of the band are also substantially identical. In the embodiment where the two elements coupled together are orthogonal, the longitudinal planes of symmetry of the two openings form a rectangular dihedron. In the vicinity of at least one of the rims delimiting the openings, the band may comprise a screw-threaded bore in which a retaining screw is positioned, this screw being capable of assuming a position in which it bears against the element arranged in the corresponding recess.

In the embodiment of a first modification, at least one of the elements which are mechanically coupled together by the coupling member is a cylindrical element. The cylindrical element can have a circular cross-section. The band of the coupling member can conveniently have a flattened zone in the vicinity of each of the two points of the rim which lie in the longitudinal plane of symmetry of one of the openings which receives the cylindrical element of circular cross-section. In the embodiment in which the coupling member prevents translatory motion of the cylindrical element relative to the said member in a direction other than that of the longitudinal axis of the cylindrical element, provision is made for ensuring that the rim corresponding to the cylindrical element extends over a sector of a cylinder which is contained in a dihedron, whose apex is that longitudinal axis of the cylindrical element, and whose angle is between 180° and 369°. A coupling member of this kind can conveniently effect the coupling of two cylindrical elements of circular cross-section; the two cylindrical elements referred to above can be identical. Advantageously, the arrangement may be such that the distance d between the longitudinal axes of the two cylindrical elements coupled together by the coupling member is between zero and $2\times(R1+R2)$, where $R1$ and $R2$ are the radii of the two cylindrical elements. At least one of the cylindrical elements is deformed in the coupling area or divided into two sections, if d is smaller than $(R1+R2)$.

In a further modification, at least one of the elements which are mechanically coupled by the coupling member is a parallelepiped, part of which is positioned in one of the recesses of the coupling means. The said part has, opposite to the coupling member, a substantially rectangular front surface, the length of which is greater than the greatest dimension of the corresponding opening of the coupling member, and the width of which front surface is substantially the same as the smallest dimension of the opening.

Provision can be made for deforming the cylindrical ring made of ductile material by means of two tools each of which has the profile shape of one of the elements to be coupled by the coupling member, the two tools each simultaneously acting on a respective base of the ring and being pushed towards each other. In the embodiment of a coupling member coupling together two elements of circular cross-sectional shape, the coupling member can be obtained from a ring having circular cross-section, the ring having a diameter $\phi 0$ and a height H, using cylindrical tools whose transverse cross-section is circular, $\phi$ being the diameter of either of the tools; and the following dimensions can be advantageously adopted: $2 < \phi 0/\phi < 5$ and $1 < \phi 0/H < 2$.

The subject matter of the present invention also includes a method of manufacturing a coupling member according to the invention. In accordance with this method, a cylindrical ring can, as described above, be deformed; the deformation of the said ring can be advantageously effected by a stamping press. It will be advantageous, mainly when metal such as brass is being worked, to observe the dimensional limits indicated in the preceding paragraph of this specification. Deformation of the ring is carried out progressively until the axes of the tools lies at the intended distance d between the axes of the cylindrical elements to be coupled together. If d is smaller than the sum of the radii of the two cylindrical elements to be coupled together, one of the tools will have a groove or will be in the form of two separate sections, thereby allowing passage to the other tool at the end of the method by which the ring is deformed.

With a view to further describing the subject matter of the invention several embodiments of the invention are described below, by way of example only, and are illustrated in the accompanying drawings, in which.

Figure 1:
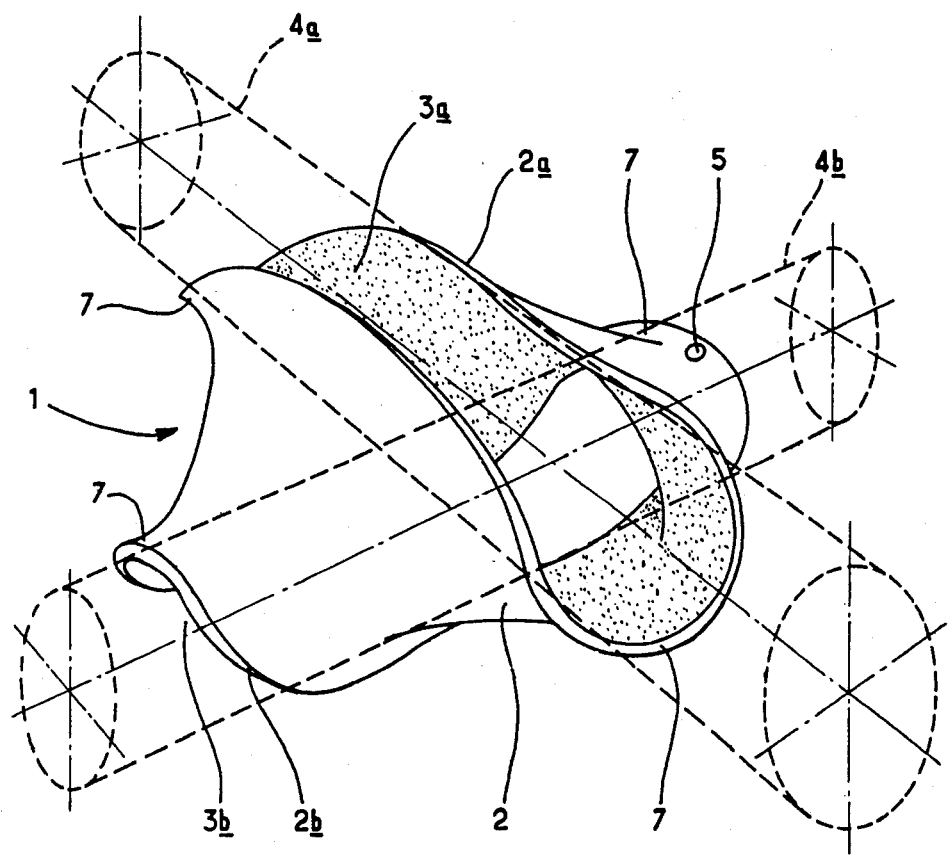
FIG. 1 is a perspective view of a coupling member according to the invention showing in outline two cylindrical tubes of identical circular cross-section assembled together, the space between the longitudinal axes of the two tubes being the same as the diameter of the tubes.
Figure 2:
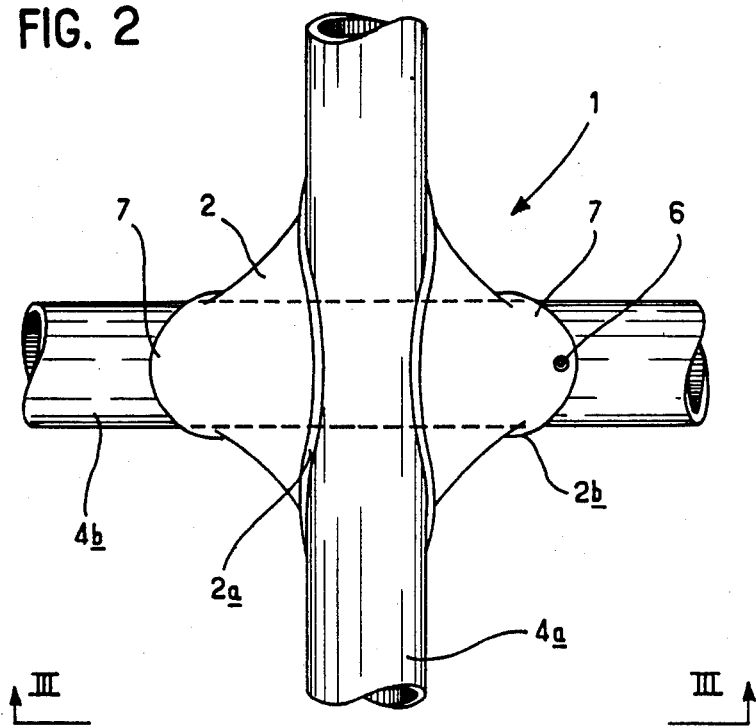
FIG. 2 is a plan view of the coupling member of FIG. 1 showing the two tubes assembled together in position.
Figure 3:
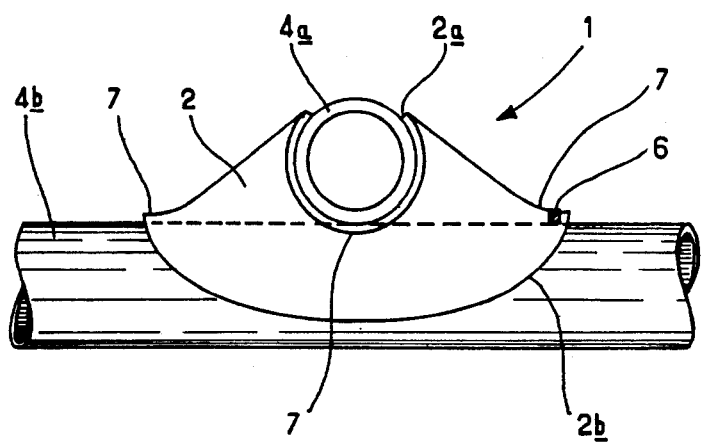
FIG. 3 is a view taken along the line III—III of FIG. 2.

FIGS. 1 to 3 show a coupling member 1. The coupling member 1 is made from a brass band which is in the form of a closed loop, and, as will be described in greater detail below, is obtained from a ring cut from a brass tube. The member has a band 2 which is limited by two rim portions 2a, 2b. Each of these rim portions 2a, 2b is in the form of a three-dimensional curved portion, which is out of true. The curved portion delimits an opening 3a, 3b, which defines the limit of a recess in which one of tubes 4a, 4b respectively can be positioned. The two tubes 4a, 4b are identical and are of circular cross-section. The areas of each of these recesses lying opposite the openings 3a, 3b for part of a single space which is laterally delimited by the band 2. Each rim portion 2a, 2b in the form of a curve substantially traced on a cylinder corresponding to the outer wall of one of tubes 4a 4b respectively. The cylindrical load-bearing surface of the rim portions 2a, 2b extend in such a way as to include a dihedral angle of 270°, whose edge lies on the axis of the cylindrical load-bearing surface. Each rim portion 2a, 2b has two planes of symmetry, viz. a longitudinal plane of symmetry, which contains the axis of the cylindrical load bearing surface, and a transverse plane of symmetry which extends perpendicularly to the longitudinal plane of symmetry and passes through the axis of the cylindrical load-bearing surface of the other rim portion 2a, 2b respectively.

A screwthreaded bore 5 is formed in the band 2 in the vicinity of one of the points of the rim portion 2b which lies in the longitudinal plane of symmetry of the corresponding opening. The screwthreaded bore 5 passes right through the thickness of the band 2. A point screw 6 is arranged inside the bore 5 and, by a screwing action, can be caused to bear against the tube 4b. The point screw 6 can securely lock the tubes 4a and 4b in the coupling member since, not only is the tube 4b immobilised in the coupling member, but also the rim portion 2a is caused to bear, with strong pressure, and through reaction, against the wall of the tube 4a. It should be noted that the four terminal zones of the coupling member 1, that is to say the four zones lying the furthest distance away from the axis of the coupling member, extending perpendicularly to the two axes of the tubes 4a and 4b, are in the form of flattened areas 7. The screwthreaded bore 5 has been provided in one of these four flattened areas 7.

Figure 4:
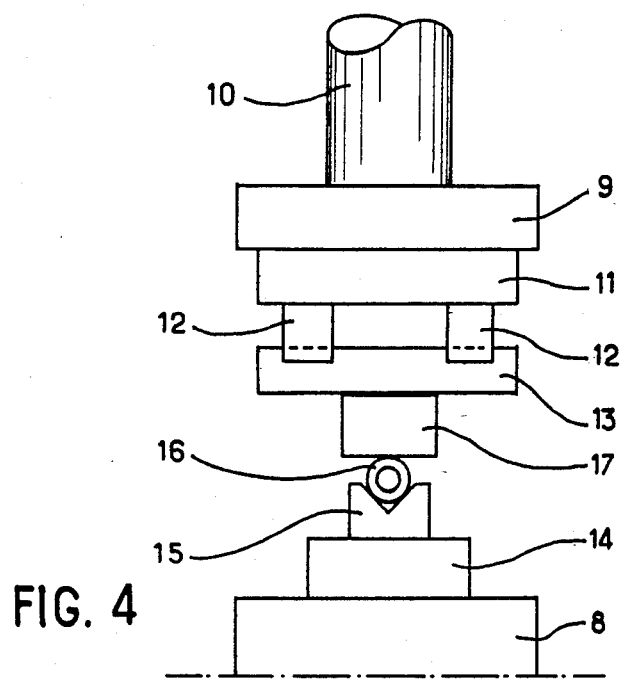
FIG. 4 is a schematic view of a press which is equipped with tools by which the coupling member shown in FIGS. 1 to 3 can be obtained by pressing.
Figure 5:
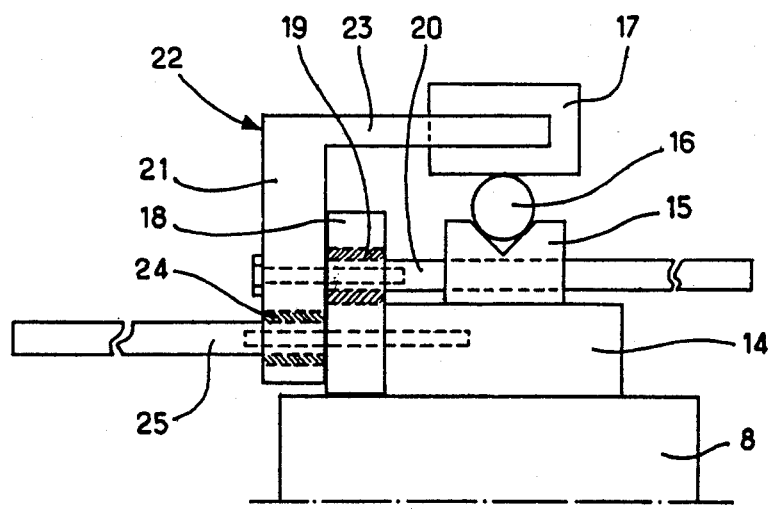
FIG. 5 shows a detail of the press shown in FIG. 4.

FIGS. 4 and 5 show schematically a vertical stamping press be which the coupling member of FIGS. 1 to 3 can be made. The press comprises a fixed plate 8, which is firmly secured to a frame, and also a movable plate 9 which can execute translatory motion under the effect of a piston 10 of a jack. The movable plate 9 carries an attachment plate 11, to which two V-supports 12 are fixed. The V-supports 12 engage by their shanks the two ends of a tool 13, which is made from a metal rod whose external diameter is the same as that of the tubes 4a and 4b.

The fixed plate 8 also carries an attachment plate 14, which supports two V-supports 15. The V-supports 15 are identical to, but extend perpendicularly to the V-supports 12. The V-supports 15 support the second tool 16, which is made from a solid metal rod identical to the rod 13. The axes of the tools 13 and 16 are mutually perpendicular. A brass ring 17, from which the coupling member 1 is to be formed, is placed between the tools 13 and 16. The brass ring 17 is a cylindrical ring cut from a brass tube. If it is assumed that the diameter of the tubes 4a, 4b and of the tools 13 and 15 is 20 mm, it is advantageous to give the ring 17 an external diameter of 50 mm, a height of 30 mm, and a thickness of 1.5 mm.

FIG. 5 illustrates schematically how the ring 17 can be positioned on the tool 16 and how the ring 17 can be secured in this position, during the movement of the tool 13, until the tool 13 comes into contact with the ring 17. Whereupon as the ring 17 is wedged between the two tools 13 and 16, it no longer has to be held, since the axis of the ring 17 extends perpendicularly to the axes of the two rings 13 and 16. The supporting plate 14, which is carried by the fixed plate 8 of the press, is firmly secured to a vertical block 18, in which an axial roller bearing 19, having a horizontal axis, is arranged. A ground rod 20 slides in the axial roller bearing 19 and is firmly secured to a vertical part 21 of a jib 22, having a fork 23 as a horizontal part. The vertical part 21 of the jib 22 comprises, at its base, an axial roller bearing 24 inside which a ground rod can slide, the rod 25 being firmly secured to the supporting plate 14. The axis of the roller bearing 24 and the rod 20 are mutually parallel, so that the horizontal translatory motion of the fork 23 is very accurately guided. This translatory motion of the fork 23 is parallel with the axes of the rods 20 and 25. Thus, the ring 17 can be accurately positioned relative to the tools 13 and 16.

When the movable plate 9 of the press is lifted, a ring 17 is placed on the tool 16 by the fork 23 of the positioning device. The ring 17 is in position when the vertical part 21 of the jib 22 bears against the block 18. The movable plate 9 then descends until the tool 13 bears against the ring 17, and the jib 22 then slides laterally to ensure that it will be out of range of the tool 13. The pressure of the press is then applied to the ring 17, to tool 13 moving towards the tool 16. The movement of the movable plate 9 is controlled so as to correspond to the application of pressure of the tool 13 to the tool 16 in the centre area of the coupling member 1 thus formed. The deformation of the ring 17 takes place progressively and symmetrically. When this deformation has ended, the tool 16 is removed, by sliding, from the coupling member 1 obtained. The tool 13 is then moved away in the same fashion; the tools 13 and 16 are re-positioned in their respective supports 12 and 15, and the press is ready for a new working cycle.

It will be apparent that manufacture of the coupling member 1 can take place simply and without difficulties. It will also be noted that the workpiece obtained is of a pleasing appeance.

FIGS. 6 to 10 show schematically a certain number of additional embodiments of the coupling member according to the invention.

Figure 6:
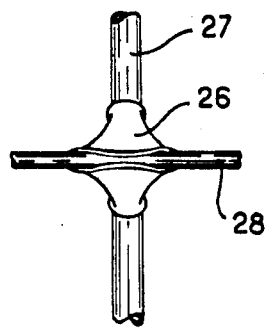
FIGS. 6 to 10 are schematic views of different embodiments of the coupling member according to the invention.

As is shown in FIG. 6, a large diameter tube 27 and a small diameter tube 28 can be assembled together using a coupling means 26. The minimum distance between two points of the rims of the coupling member is smaller, in the case of each rim, than the diameter of the tube concerned, so that the tube is "captive" within the coupling member and can only be removed from the latter by a translatory motion.

Figure 7:
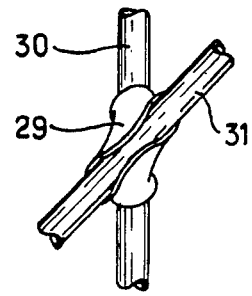

FIG. 7 shows a coupling member 29 by which two tubes 30 and 31, having the same diameter as each other, can be coupled together, the angle between the axes of the tubes 30 and 31 being 45°. In this embodiment, the shape of the rims of the coupling member 29 is such that the tubes are "captive" within the coupling member.

Figure 8A:
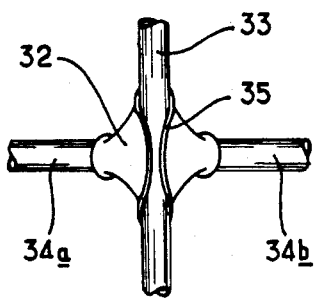
Figure 8B:
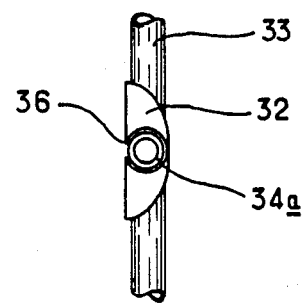

FIGS. 8a and 8b respectively illustrate a plan view and a side view of an assembly in which a coupling member 32 couples together a tube 33 and two tube sections 34a and 34b, which are identical to one another and are of the same diameter as the tube 33. The axes of the two tube sections 34a and 34b are mutually aligned; they extend perpendicularly to the tube 33, and bear against the tube 33. There is a minimum distance between two points of the rim 35, which is small enough to ensure that the tube 33 is "captive" within the coupling member 32. The same is true of the rim 36 which co-operates with the two tube sections 34a and 34b.

Figure 9:
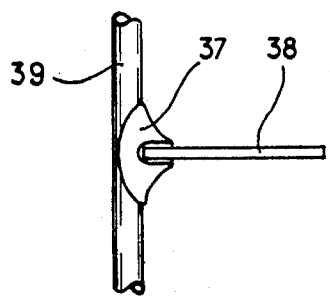

FIG. 9 illustrates a planar plate 38 coupled to a tube 39 using a coupling member 37. The shape of the means 37 is such that the tube 39 is "captive" within the coupling member 37. A tool, by which it has been possible to define the rim corresponding to the opening which the plate 38 engages, has the shape of the end of the plate 38. Of course, in this embodiment, the plate 38 is simply positioned within the coupling member 37 and is not held "captive" within the coupling member. The plate 38 is free to execute translatory motion relative to the coupling member 37.

Figure 10:
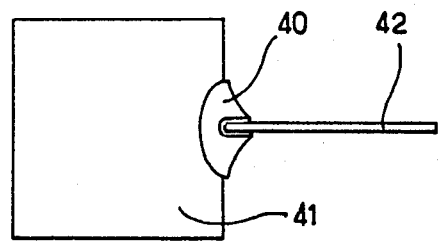

FIG. 10 illustrates a coupling member 40 by which two mutually perpendicularly extending plates 41 and 42 can be coupled together. In this embodiment, the two plates 41 and 42 can freely execute translatory motion relative to the coupling member 40, but are prevented from rotating relative to the coupling member, and are also prevented from rotating relative to each other.

It is to be understood that the above-described embodiments are provided by way of example only and may be modified in any desired way within the scope of the invention.

We claim:

1. A method for making a coupling element for coupling together two elongated members extending at an angle to each other comprising the steps of, providing a one-piece closed loop band of a ductile material, the band having a sidewall curving around a central axis, and first and second ends, each having continuous rims, positioning the band between a first elongated tool having an axis extending diametrically of the band, and a second elongated tool having an axis extending diametrically of the band and at an angle to the first tool, so that the continuous rim of the first end of the band faces the first tool and the continuous rim of the second end of the band faces the second tool, at least one of said tools have transverse dimensions, transverse to the length of the tool which are less than the facing diameter of the band, and moving the tools toward each other to deform the rim of the first end of the band around the first tool and to simultaneously deform the rim of the second end of the band around the second tool as a result of the forces exerted on the band by said tools.

2. A method according to claim 1 wherein said step of providing a band comprises providing a band having a cylindrical side wall.

3. A method according to claim 1 wherein said step of providing a band comprises providing a band having first and second ends which are parallel to each other.

4. A method according to claim 1 wherein said band has a circular cross-section of a diameter $\phi 0$ and a height of H; each tool is a cylinder of circular cross-section, $\phi 0$ is the diameter of either tool, and $2 < \phi 0/\phi < 5$ and $1 < \phi 0/H < 2$.

5. A method according to claim 4 wherein the band is deformed until the axes of the tools are spaced apart a distance not greater than the sum of the radii of the first and second tools.

6. A method according to claim 5 wherein the band is deformed until the axes of the tools are spaced apart a distance less than the sum of the radii of the first and second tools.

7. A method according to claim 1 wherein said ends of the band are deformed at least 180° around said tools.

8. A method according to claim 7 wherein at least the first end of the band is deformed more than 180° around the first tool.

9. A method according to claim 8 wherein the second end of the band is deformed more than 180° around the second tool.

10. Apparatus for forming a coupling element, for coupling together two cylindrical members with their axes at an angle to each other, from a closed circular band, said apparatus comprising, a first tool having a cylindrical profile greater than 180° and a diameter less than the diameter of the band, a second tool having a cylindrical profile greater than 180° and a diameter less than the diameter of the band, means mounting said tools with their axes at an angle to each other and at opposite ends of the band, and means for forcing said tools together to simultaneously deform both ends of the band more than 180° around the respective cylindrical portions of the tools.

* * * * *